(12) United States Patent
Dantlgraber

(10) Patent No.: US 7,686,607 B2
(45) Date of Patent: Mar. 30, 2010

(54) ACTUATOR

(75) Inventor: Joerg Dantlgraber, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 608 days.

(21) Appl. No.: 11/597,132

(22) PCT Filed: Mar. 29, 2005

(86) PCT No.: PCT/EP2005/003260

§ 371 (c)(1),
(2), (4) Date: Dec. 18, 2006

(87) PCT Pub. No.: WO2005/118252

PCT Pub. Date: Dec. 15, 2005

(65) Prior Publication Data

US 2008/0050464 A1      Feb. 28, 2008

(30) Foreign Application Priority Data

Jun. 4, 2004    (DE) .................... 10 2004 027 279

(51) Int. Cl.
*B29C 45/17* (2006.01)
(52) U.S. Cl. .................... 425/542; 425/556; 425/574; 425/595; 60/545; 60/565
(58) Field of Classification Search ............. 425/542, 425/556, 574, 589, 595; 60/545, 565
See application file for complete search history.

(56) References Cited

U.S. PATENT DOCUMENTS

| 3,263,277 | A | * | 8/1966 | Ohlendorf et al. ........ 425/451.2 |
| 3,801,257 | A | | 4/1974 | Aoki |
| 4,030,299 | A | * | 6/1977 | Reuschel et al. ............. 60/560 |
| 5,345,766 | A | * | 9/1994 | Leonhartsberger et al. .... 60/545 |
| 6,439,875 | B1 | * | 8/2002 | Morita et al. .............. 425/556 |
| 6,884,057 | B2 | * | 4/2005 | Dantlgraber ............... 425/589 |
| 6,935,111 | B2 | * | 8/2005 | Dantlgraber ................. 60/565 |
| 7,351,053 | B2 | * | 4/2008 | Dantlgraber ............... 425/542 |
| 2004/0037915 | A1 | | 2/2004 | Dantlgraber | |
| 2004/0081722 | A1 | | 4/2004 | Dantlgraber | |

FOREIGN PATENT DOCUMENTS

| DE | 101 21 024 A1 | 11/2001 |
| DE | 101 43 013 A1 | 3/2003 |

\* cited by examiner

*Primary Examiner*—James Mackey
(74) *Attorney, Agent, or Firm*—Oliff & Berridge, PLC

(57) ABSTRACT

An actuator is disclosed, in particular for a locking unit of an injection compression machine, comprising a hydraulic force translator with two piston units moving relative to each other with different effective areas. The foregoing enclose a pressure chamber together with a cylinder or spacer of the force translator. The smaller piston unit is electrically driven, wherein the axial displacement of the smaller piston unit may be transmitted to the cylinder. The cylinder can be fixed relative to a chassis of the injection compression machine by means of a hydraulic clamping device. According to the invention, the pressure necessary for clamping is delivered by a high-pressure reservoir which may be charged during the displacement of the smaller piston unit.

13 Claims, 1 Drawing Sheet

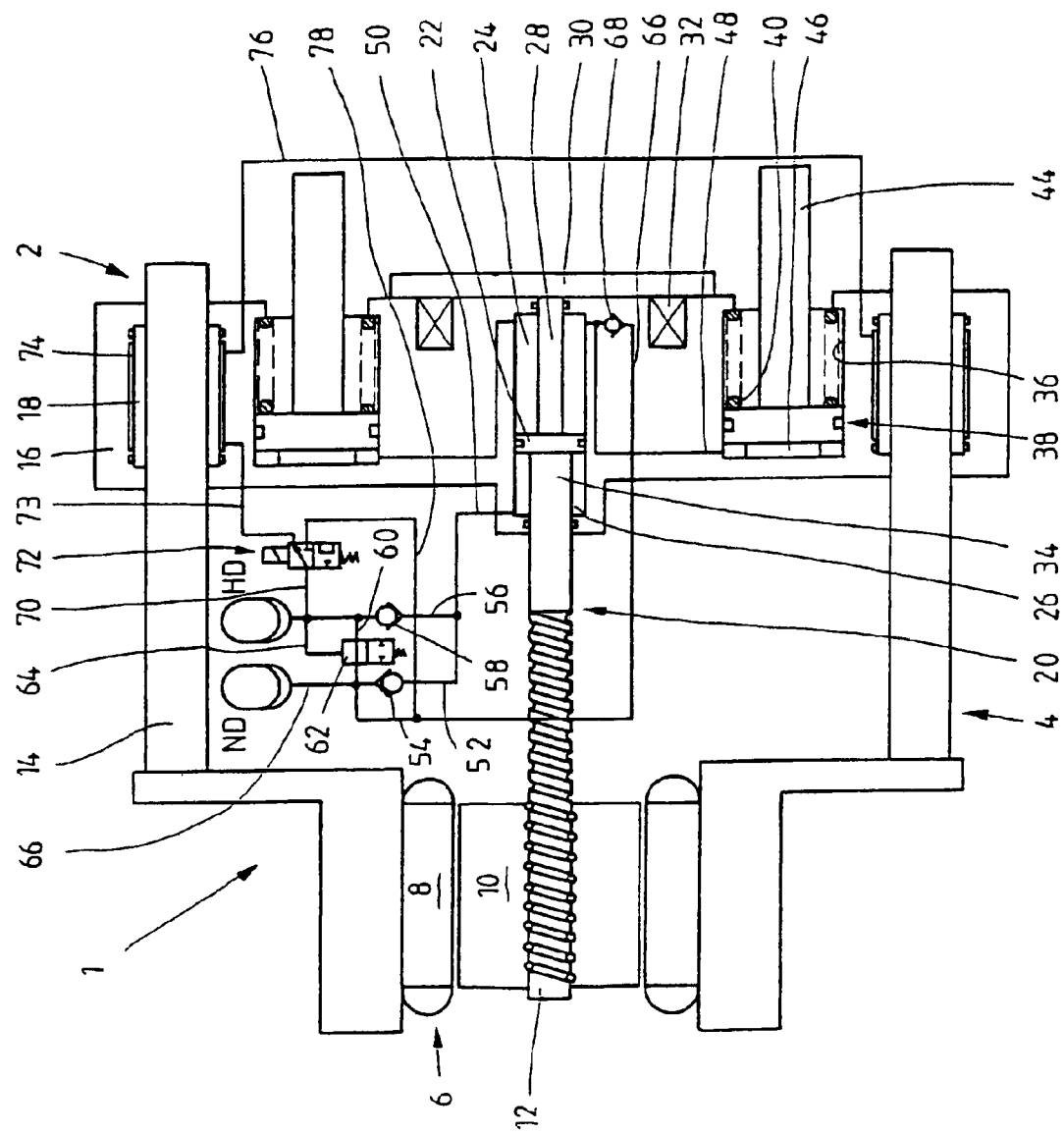

ACTUATOR

The invention relates to an actuator, in particular for a locking unit, an injection unit, a slide or an ejector of an injection molding machine or injection compression machine.

Most recently, injection molding machines have been provided with electric and hydraulic actuators, wherein via the electric drive adjusting movements are exerted at high speed with comparatively weak forces, whereas the hydraulic drive is especially advantageous when strong axial forces have to be applied with comparatively small adjusting movements.

For instance, in the case of a locking unit of a plastic injection molding machine the drive unit must fulfill two important different tasks. On the one hand, it has to move the die clamping plate for closing and opening the die as quickly as possible so as to keep the cycle time for manufacturing an injection molded part as short as possible. On the other hand, it has to apply a strong clamping force to the die clamping plate so that the die can be clamped against the high internal pressure during injection molding. Therefore, the actuator must be designed such that it is adapted to perform adjusting movements at high speed and to apply strong forces while the stroke is relatively small. Such requirements are also given in the case of ejectors, slides or the injection unit of an injection molding machine.

From the applicant's DE 101 21 024 A1 an actuator is known which is capable of meeting the aforementioned requirements. This actuator comprises a hydraulic force translator whose smaller piston unit is actuated by an electrically operated lifting screw arrangement for closing a die. Said smaller piston unit may consist of one single smaller piston or a plurality of pistons. They enclose a pressure chamber together with a cylinder or spacer and a large piston of the force translator, wherein by moving the small piston unit into the pressure chamber high pressure can be generated which acts via the large effective area of the large piston upon the movable die clamping plate which then can be clamped with great force. During rapid closing of the die with a comparatively small force the spacer is indirectly connected to a spindle nut of the spindle arrangement so that the piston unit having a smaller diameter, the large piston and the spacer are jointly displaced by the spindle arrangement. For applying the great force the spacer is frictionally fixed to the chassis of the injection molding machine so that the further closing movement of the die is defined by moving the smaller piston unit into the pressure chamber and by the appropriate axial movement of the large piston of the force translator. In the known solution (see especially FIG. 32) the pressure prevailing in the pressure chamber is applied to an external wall of the cylinder for clamping. The cylinder wall is elastic so that when a high pressure is built up in the pressure chamber it is elastically deformed outwardly against the machine chassis of the injection molding machine and is thus clamped. The cylinder is frictionally fixed so that in the case of a further feed of the spindle arrangement the pressure chamber is reduced and a strong clamping force can be built up.

In this known embodiment the cylinder is coupled hydraulically to the lifting screw arrangement during rapid feed, wherein a comparatively high pressure of a hydraulic reservoir is applied to a chamber between a separating disk movable along with the lifting screw arrangement and the large piston so that the pressure medium acts like rigid driving mechanics and the large piston takes part in the axial feed of the lifting screw arrangement. The large piston in turn is supported by a relatively strong spring at the cylinder so that it is driven by the spring. When the die is closed, the pressure chamber between the separating disk and the large piston is relieved by connecting it to a low-pressure reservoir. As a consequence, the small piston unit reduces the pressure chamber so that the cylinder—as described before—is clamped and the pressure prevailing in the pressure chamber further increases so that the large piston acts upon the die clamping plate with a great clamping force.

Accordingly, it is only possible to clamp the cylinder to the chassis of the injection molding machine when the pressure prevailing in the pressure chamber enclosed by the small piston unit and the large piston has reached a certain minimum. It has turned out that, for instance, in the case of injection compression molding where the melt is not injected in the closed but initially in a partly opened die in contrast to normal injection molding, the pressure prevailing in the pressure chamber at the beginning of the injecting operation is not sufficient for clamping the cylinder with sufficient force.

Compared to this, the object underlying the invention is to provide an actuator, in particular for a locking unit, an injection unit, slide or ejector of an injection molding machine or injection compression machine in which a reliable fixing of a cylinder of a force translator to a chassis of the machine is permitted.

According to the invention, the force translator includes, apart from a pressure chamber enclosed by the smaller piston unit and a large piston unit as well as the cylinder, another chamber which is enclosed in sections by the smaller piston unit or a means movable by the latter. When reducing the pressure chamber by axial displacement of the smaller piston unit (closing movement) the chamber is enlarged. In accordance with the invention, pressure medium is then sucked from a low-pressure reservoir into the chamber.

During the opening movement of the smaller piston unit, i.e. when the pressure chamber is enlarged, the chamber is appropriately reduced. During this opening movement the latter is connected to the high-pressure reservoir via a valve arrangement so that said high-pressure reservoir is charged. For clamping the cylinder with respect to a stationary chassis of the machine the high-pressure reservoir is connected to the clamping means via a directional control valve. The pressure prevailing in the high-pressure reservoir is high enough to allow the clamping means to engage even if the pressure prevailing in the pressure chamber is still relatively low. Consequently, this design can be used especially advantageously also for injection compression molding.

In a home position of the directional control valve the clamping means in connected to the low-pressure reservoir. The pressure of this low-pressure reservoir is so low that the cylinder is not clamped.

In a particularly preferred embodiment of the invention, the chamber is connected via a branch pipe to the low-pressure reservoir and the high-pressure reservoir, wherein in the low-pressure branch pipe a check valve (suction valve) opening in the direction of the chamber is arranged and in the high-pressure branch pipe a check valve (filling valve) opening in the direction of the high-pressure reservoir is arranged. This arrangement permits to suck pressure medium from the low-pressure reservoir when enlarging the chamber, whereas during reduction of the chamber the high-pressure reservoir is charged. The check valve on the low-pressure side prevents charging of the low-pressure reservoir when the chamber is reduced in size, whereas the check valve on the high-pressure side prevents discharging of the high-pressure reservoir during the out-movement of the smaller piston unit.

For restricting the maximum pressure in the high-pressure reservoir a pressure-limiting valve which connects the high-pressure reservoir to the low-pressure reservoir upon exceeding the maximum pressure may be provided between the two branch pipes.

The small piston unit includes, in a preferred embodiment, a piston which is electrically driven via a lifting screw arrangement. This piston has a central piston collar and two piston rods one of which extends through the pressure chamber and the other extends through the chamber. The piston rod on the chamber side has a larger diameter than the piston rod on the pressure chamber side.

The piston rod on the pressure chamber side includes at its free end portion an anchor plate adapted to be connected to the cylinder via an electromagnetic coupling. In this way, the axial movement of the piston is transmitted to the cylinder via the anchor plate and the electromagnetic coupling so that the piston is caught when the coupling is engaged.

In an embodiment the large piston unit consists of a plurality of smaller force pistons to the effective areas of which the pressure prevailing in the pressure chamber is applied and which are guided axially movably in the cylinder.

It is preferred to pressurize said force pistons via a respective biased spring in the direction of a home position.

Other advantageous further developments of the invention constitute the subject matter of further subclaims.

Hereinafter a preferred embodiment of the invention is explained in detail by way of a schematic drawing showing a functional diagram of a locking unit of an injection compression machine.

In a locking unit 1 of this type a movable die clamping plate not represented is moved via a force translator 2 for closing, clamping or opening the die. The force translator 2 is supported axially movably on a chassis 4 of the injection molding machine and is operated by an electrical actuator 6. The actuator 6 supported on the chassis of the machine 4 comprises an electric motor including a stator 8 and a rotor connected to a spindle nut 10. The latter meshes with a fixedly supported lifting screw 12 which is displaced in axial direction when the electric motor is driven and the spindle nut 10 is rotated. In the shown embodiment the spindle nut 10 and the spindle 12 are in threaded engagement with each other via a ball roller thread. Of course, also other spindle designs can be used.

The force translator 2 of cylindrical design is guided axially movably at plural columns 14 of the chassis 4 of the injection compression machine. A cylinder 16 of the force translator 2, which is an example of a spacer, includes plural clamping sleeves 18 at its outer circumference which are slidingly guided on the columns 14 passing through the cylinder 16. It is equally possible to realize the guide by further columns not represented.

The axial displacement of the cylinder 16 along the columns 14 is performed via a piston 20 which is formed integrally with the spindle 12 in the shown embodiment or is mounted to the same.

The piston 20 is guided with a radially projecting piston collar 22 in a cylinder chamber subdivided into a pressure chamber 24 and a chamber 26 by the piston collar 22.

In extension of the piston collar 22 to the right a piston rod 28 is provided which passes through the cylinder 16 in axial direction and to the end portion of which projecting from the cylinder 16 an anchor plate 30 is mounted. In the area of the anchor plate 30 an electromagnetic coupling 32 is provided at the cylinder 16, wherein the anchor plate 30 is connected to the cylinder 16 when current is supplied to the electromagnetic coupling 32. When the coupling is disengaged, the anchor plate 30 can lift off the cylinder 16.

The piston rod member 34 formed between the spindle 12 and the piston collar 22 passes through the chamber 26.

In recesses 36 of the cylinder 16, a respective force piston 38, which is biased by a spring 40 into a home position at the bottom of the recess 36 is guided to be axially moving. Each force piston 38 includes a radially reset rod 44 which acts upon the movable die clamping plate not represented.

Cylinder chambers 46 connected to the pressure chamber 24 via pressure ducts 48 are confined by the bottom of the recess 36 and the force piston 38. In terms of hydraulics, thus the annular pressure chamber 28, the pressure ducts 48 and the cylinder chambers 46 of the cylinder 16 form a common pressure medium chamber. The sum of the effective diameters of the force pistons 38 is substantially larger than the annular end face of the piston collar 22 on the right in the FIGURE. This annular end face and the total surface of the force pistons 38 define the translation ratio of the force translator 2.

According to the FIGURE, the annular chamber 26 of the cylinder 16 is connected to a low-pressure reservoir ND and a high-pressure reservoir HD via a branching storage duct 50. In the branch line 52 leading to the low-pressure reservoir ND a check valve opening in the direction of the chamber 26 is arranged which acts as suction valve 54. In the other branch pipe 56 a check valve opening in the direction of the high-pressure reservoir HD is arranged which acts as filling valve 58.

In the area between the two reservoirs HD and ND and the two valves 54, 58 a relief duct 60 including a pressure-limiting valve 62 is disposed, the latter being biased via a spring into its locking position (at the bottom in the FIGURE) and the pressure prevailing in the right branch pipe 56, i.e. high pressure being applied to the control chamber thereof effective in the opening direction via a control duct 64. The spring is adjusted such that the pressure-limiting valve 62 is shifted to the shown opening position upon exceeding a predetermined maximum pressure so that the high-pressure peak can be relieved toward the low-pressure branch.

As one can furthermore take from the FIGURE, the annular pressure chamber 24 is connected to a pipe section of the branch pipe 52 between the suction valve and the low-pressure reservoir ND via a filling pipe 66 and a suction valve 68. The suction valve 68 is a check valve and opens in the direction of the annular pressure chamber 24.

From the high-pressure branch pipe 56 a clamping pipe 70 which leads to the input port of an electrically actuated directional control valve 72. An output port of the directional control valve 72 is connected via a clamping duct 73 to a clamping chamber 74 encompassing the outer periphery of the clamping sleeve 18. The individual clamping chambers 74 of the clamping sleeves 18 of the cylinder 16 are hydraulically interconnected via a connecting duct 76.

The other output port of the 3/2 directional control valve 72 is connected to the filling pipe 66 via a low-pressure duct 78.

In the spring-biased home position of the directional control valve 72 the clamping duct 73 and the low-pressure duct 78 are connected to each other. When current is supplied to a solenoid of the directional control valve 72, the low-pressure duct 78 is blocked and the clamping pipe 70 is connected to the high-pressure clamping duct 73.

It is assumed that the die is opened for ejecting the molded parts and, accordingly, the locking unit is returned to its home position shown in the FIGURE. Both the directional control valve 72 and the pressure-limiting valve 62 are in their spring-biased home position (at the bottom in the FIGURE) so that the clamping chambers 74 of the clamping sleeves 18 are connected with low pressure. The electric coupling 32 is engaged and thus the anchor plate 30 is connected to the cylinder 16.

For rapidly clamping the die (quick traverse) the actuator 6 is controlled and the spindle nut 10 is appropriately rotated. The rotation of the spindle nut 10 is translated into an axial displacement of the spindle 12 and appropriately into a stroke of the piston 20. Due to the engaged coupling 32 and the clamping sleeves 18 to which only low pressure is applied, the cylinder 16 is displaced according to the stroke of the piston 20. When the die has reached its closing position required for injection compression molding, which does not correspond to the completely closed position, the electric coupling 32 is switched dead so that the anchor plate 30 can lift off the cylinder 16. Simultaneously, or few milliseconds before, the directional control valve 72 is changed over against the force of the spring so that high pressure is applied to the clamping chambers 74. By said high pressure, the clamping sleeves 18 are deformed radially inwardly and are frictionally adjacent to the columns 14 so that the cylinder 16 is clamped with respect to the chassis 4 of the machine. Up to complete clamping, the springs 40 ensure, when the die is closed, that the cylinder 16 does not yield to the left.

With a further stroke of the piston 20 the anchor plate 30 lifts off the cylinder 16 and the pressure chamber 24 is reduced, while the chamber 26 is appropriately enlarged. Pressure medium is sucked from the low-pressure reservoir ND via the suction valve 54 into the enlarging chamber 26. By reducing the size of the pressure chamber 24, the pressure prevailing in the cylinder chambers 46 is adequately increased so that a great locking force which results from the product of the pressure prevailing in the cylinder chambers 46 (corresponds to the pressure prevailing in the pressure chamber 24) and the effective area of the force pistons 44 minus the force of the springs 40 can be applied to the die. The reaction force acting on the lifting screw 12, on the other hand, is defined by the product of the pressure prevailing in the pressure chamber 24 and the substantially smaller annular end face of the piston collar 22 minus the pressure force in the chamber 26 so that the load of the ball-type linear drive (roller-type linear drive) is small.

For opening the die, the directional control valve 72 is switched dead so that it is moved back into its spring-biased home position in which low pressure is applied to the clamping chambers 74. At the same time, the actuator 6 is controlled so that the spindle 12 and thus the piston 20 moves back to the left into its home position shown in the picture. This rear movement is transmitted to the cylinder 16 via the anchor plate 30, at the same time the springs 40 urge the force pistons 38 back into their shown home position in which the cylinder chambers 46 have a minimum volume. During this rear movement of the spindle 12 and thus of the piston 20 the pressure chamber 24 is enlarged, wherein pressure medium is sucked from the low-pressure reservoir ND via the suction valve 68 and the filling pipe 66.

The chamber 26 is appropriately reduced so that pressure medium is displaced therefrom via the storage duct 50 and the branch pipe 56 as well as the filling valve 58 to the high-pressure reservoir HD—the high-pressure reservoir HD is charged. The maximum storage pressure is restricted by the pressure-limiting valve 62 to the maximum value dependent on the force of the spring of said valve.

After reaching the home position represented in the picture the high-pressure reservoir HD is charged again and the locking unit is ready for the next cycle. Since clamping is always performed by the high pressure prevailing in the high-pressure reservoir HD, the clamping force does not depend on the position of the spindle 12 so that reliable clamping is also possible when a comparatively low pressure is prevailing in the pressure chamber 24.

Instead of the plurality of force pistons 38 also one single large piston might be used.

There is disclosed an actuator, in particular for a locking unit of an injection compression machine, comprising a hydraulic force translator with two piston units moving relative to each other with different effective areas. The foregoing enclose a pressure chamber together with a cylinder or spacer of the force translator. The smaller piston unit is electrically driven, wherein the axial displacement of the smaller piston unit may be transmitted to the cylinder. The cylinder can be fixed relative to a chassis of the injection compression machine by means of a hydraulic clamping device. According to the invention, the pressure necessary for clamping is delivered by a high-pressure reservoir which may be charged during the displacement of the smaller piston unit.

LIST OF REFERENCE NUMERALS

1 Locking unit
2 force translator
4 chassis
6 electrical actuator
8 stator
10 spindle nut
12 spindle
14 column
16 cylinder
18 clamping sleeve
20 piston
22 piston collar
24 pressure chamber
26 chamber
28 piston rod
30 anchor plate
32 coupling
34 piston rod member
36 recess
38 force piston
40 spring
44 rod
46 cylinder chamber
48 pressure duct
50 storage duct
52 branch pipe
54 suction valve
56 branch pipe
58 filling valve
60 relief duct
62 pressure-limiting valve
64 control duct
66 filling pipe
68 suction valve
70 clamping pipe
72 directional control valve
73 clamping duct
74 clamping chamber
76 connecting duct
78 low-pressure duct

The invention claimed is:
1. An actuator, comprising:
a hydraulic force translator with a first piston unit and a second piston unit that move relative to each other, wherein:

the first piston unit has an effective area that is larger than the second piston unit, the first piston unit and the second piston unit enclose a pressure chamber together with a spacer, and the spacer can be fixed relative to a stationary chassis by a hydraulically operated clamping device that applies an axial force;

a first pressure reservoir and a second pressure reservoir adapted to be connected via a valve arrangement to a chamber of the force translator, the first pressure reservoir having a higher pressure than the second pressure reservoir, wherein the chamber of the force translator is:

operatively connected to the second piston unit, enlarged during an out-movement of the second piston unit, connected to the second pressure reservoir via the valve arrangement, and, connected via the valve arrangement to the first pressure reservoir so as to charge the first pressure reservoir when reducing the chamber in size; and a directional control valve that connects the first pressure reservoir to the clamping device.

2. The actuator according to claim 1, wherein the directional control valve connects the clamping device to the second pressure reservoir in a home position and to the first pressure reservoir in a switching position.

3. The actuator according to claim 1, wherein:

the chamber can be connected via a storage duct to the first pressure reservoir or to the second pressure reservoir, in a first branch pipe of the valve arrangement leading to the second pressure reservoir, a suction valve opening in a direction of the chamber is provided, and in a second branch pipe of the valve arrangement leading to the first pressure reservoir, a filling valve opening in a direction of the first pressure reservoir is provided.

4. The actuator according to claim 3, wherein the first branch pipe is connected to the second branch pipe via a pressure-limiting valve.

5. The actuator according to claim 1, wherein the second piston unit is driven by a lifting screw arrangement.

6. The actuator according to claim 5, wherein the second piston unit includes a piston which is operatively connected to a spindle and has a central piston collar by which the pressure chamber is separated from the chamber.

7. The actuator according to claim 6, wherein:

the piston passes through the pressure chamber and the chamber by a piston rod, and a portion of the piston rod on a side of the pressure chamber has a smaller diameter than a portion of the piston rod passing through the chamber.

8. The actuator according to claim 7, wherein an end portion of the piston rod projecting from the spacer supports an anchor plate which can be connected to the spacer via an electromagnetic coupling.

9. The actuator according to claim 1, wherein the first piston unit is formed by a plurality of force pistons.

10. The actuator according to claim 9, wherein each force piston is biased by a biased spring in a direction of a home position.

11. The actuator according to claim 1, wherein the clamping device includes at least one clamping sleeve arranged in a clamping chamber which can be connected to the first pressure reservoir or the second pressure reservoir via the directional control valve.

12. The actuator according to claim 1, wherein the second piston unit is electrically driven.

13. A locking unit, an injection unit, slide or ejector of an injection molding machine or injection compression machine comprising the actuator according to claim 1.

* * * * *